United States Patent [19]

Dudley

[11] Patent Number: 4,888,881
[45] Date of Patent: Dec. 26, 1989

[54] DIRECT HEIGHT MEASURING DEVICE FOR SURVEYING INSTRUMENTS

[76] Inventor: Edgar E. Dudley, 5352 First Ave., North, Birmingham, Ala. 35212

[21] Appl. No.: 279,783

[22] Filed: Dec. 5, 1988

[51] Int. Cl.$^4$ .............................................. G01B 3/02
[52] U.S. Cl. .................................... 33/759; 33/770; 33/299
[58] Field of Search ............... 33/759, 760, 769, 755, 33/770, 757, 299, 291, 292, 293

[56] References Cited

U.S. PATENT DOCUMENTS 1,654,164  12/1927  Eldridge ........................... 33/755 X
2,575,245  11/1951  Carlson et al. ..................... 33/295 X

FOREIGN PATENT DOCUMENTS 909023  4/1946  France ................................. 33/755

Primary Examiner—Harry N. Haroian
Attorney, Agent, or Firm—C. A. Phillips

[57] ABSTRACT

A direct measuring device for the direct and exact measurement of the height of a surveying instrument above a ground point. The direct measurement device includes a frame having an upstanding portion and a pair of arms substantially normally extending therefrom. The upper arm has an adapter thereon which is similar to the base or centering flange of the theodolite or other surveying instrument to be used in the surveying operation. The adapter is positioned in an instrument support (tribrach) carried on the tripod in a manner similar to that which the base or centering flange of a surveying instrument is mounted in the tribrach, and a measuring tape secured to the lower arm of the frame measures the distance to the ground from the device. The surveying instrument is then positioned on the tripod in the place of the direct measurement device.

8 Claims, 2 Drawing Sheets

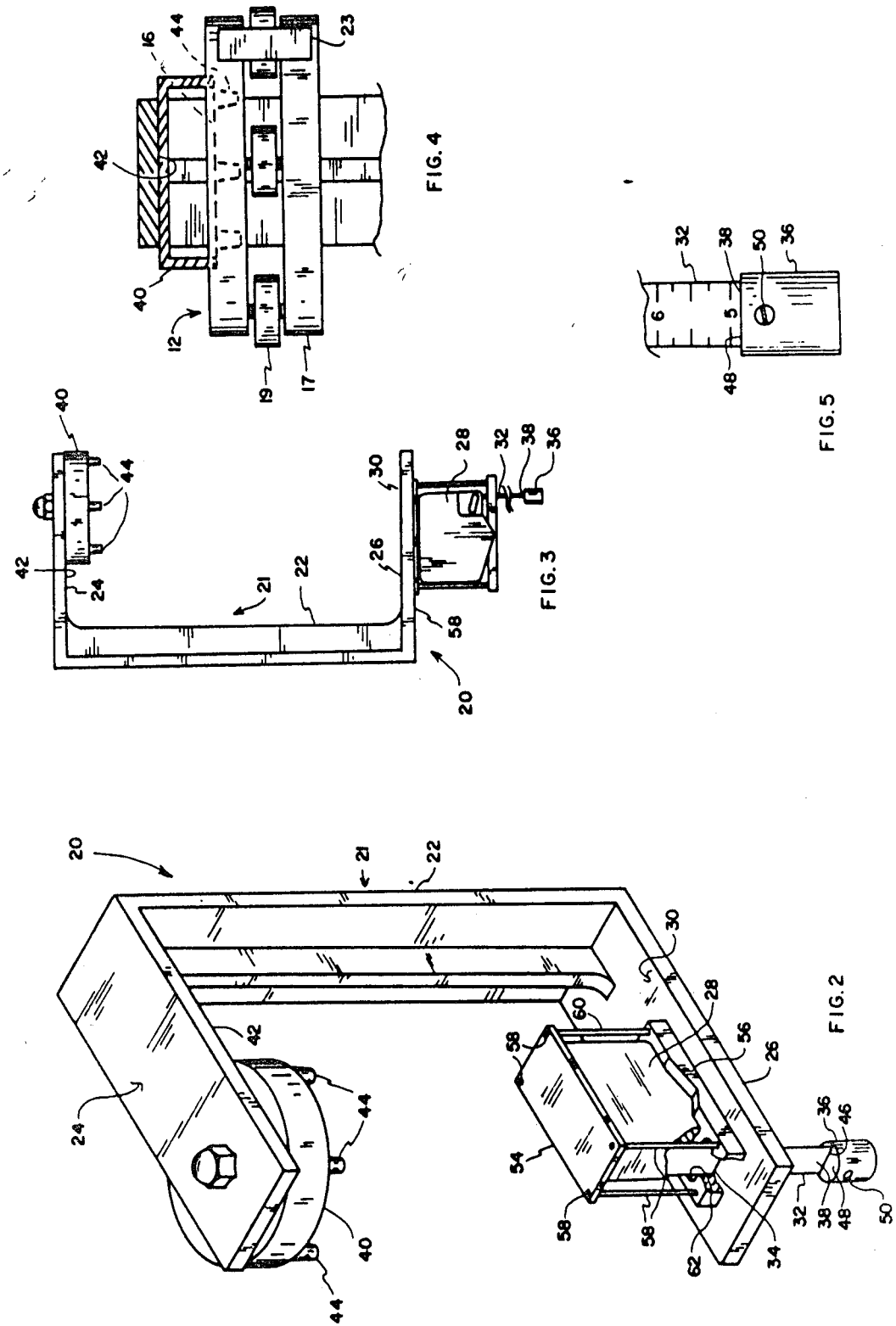

DIRECT HEIGHT MEASURING DEVICE FOR SURVEYING INSTRUMENTS

FIELD OF THE INVENTION

This invention is directed generally to surveying instruments and more particularly to apparatus for providing a direct measurement of the height of such a surveying instrument above a surface on which a tripod having the surveying instrument thereon is supported.

BACKGROUND OF THE INVENTION

In a surveying operation, including setting out, alignment, control in precise construction, machine assembly, and laboratory investigations, it is necessary that the precise height of a surveying instrument above a given surface be known. Such surveying instruments typically include theodolites, target plates, etc. Manual type height measurements are generally accomplished after a particular instrument has been mounted in an instrument engaging support member (tribrach) carried on a supporting member, such as a tripod. Typically, after each instrument has been mounted and aligned, a measurement of the distance between the instrument and ground is taken for the particular instrument so mounted since such distance of a given point of each particular instrument and ground may vary considerably.

The device of the present invention provides a measurement device which will permit a tripod having an instrument support, or tribrach, carried thereon to be set up and directly measured one time during the set-up operation. The direct measurement device is then removed, and any of a plurality of surveying instruments may be successively mounted and replaced on the tribrach.

SUMMARY OF THE INVENTION

A direct measuring device for measuring the distance between the ground and a surveying instrument. The direct measuring device includes a frame having a central upstanding portion and upper and lower arms extending therefrom in substantially normal relation. An adapter which includes a plurality of holding studs extending therefrom is mounted on the upper arm and is disposed for centering in an instrument support (tribrach) carried on the tripod. A tape measuring device is supported on the lower arm and includes a calibrated tape having a weight adjustably secured to the distal end thereof. The direct measuring device is mounted and centered in the tribrach, and the distance to the tribrach or to a point on the adapter is measured prior to mounting of the surveying instrument on the tripod for the surveying operation.

BRIEF DESCRIPTION OF THE DRAWINGS

FIG. 2 is a pictorial view of the direct measurement device assembly of the present invention with a measurement tape mounted on the upper surface of a lower part of the support bracket of the device.

FIG. 3 is an elevational view of the direct measurement device wherein the tape measure is mounted on the lower surface of the lower part of the support bracket of the device.

FIG. 4 is an enlarged elevational view, partially cut away, of the tribrach having the direct measurement device of the present invention mounted thereon.

FIG. 5 is a partial elevational view of the tape and weight therefor.

DESCRIPTION OF THE PREFERRED EMBODIMENT

Figure 1:
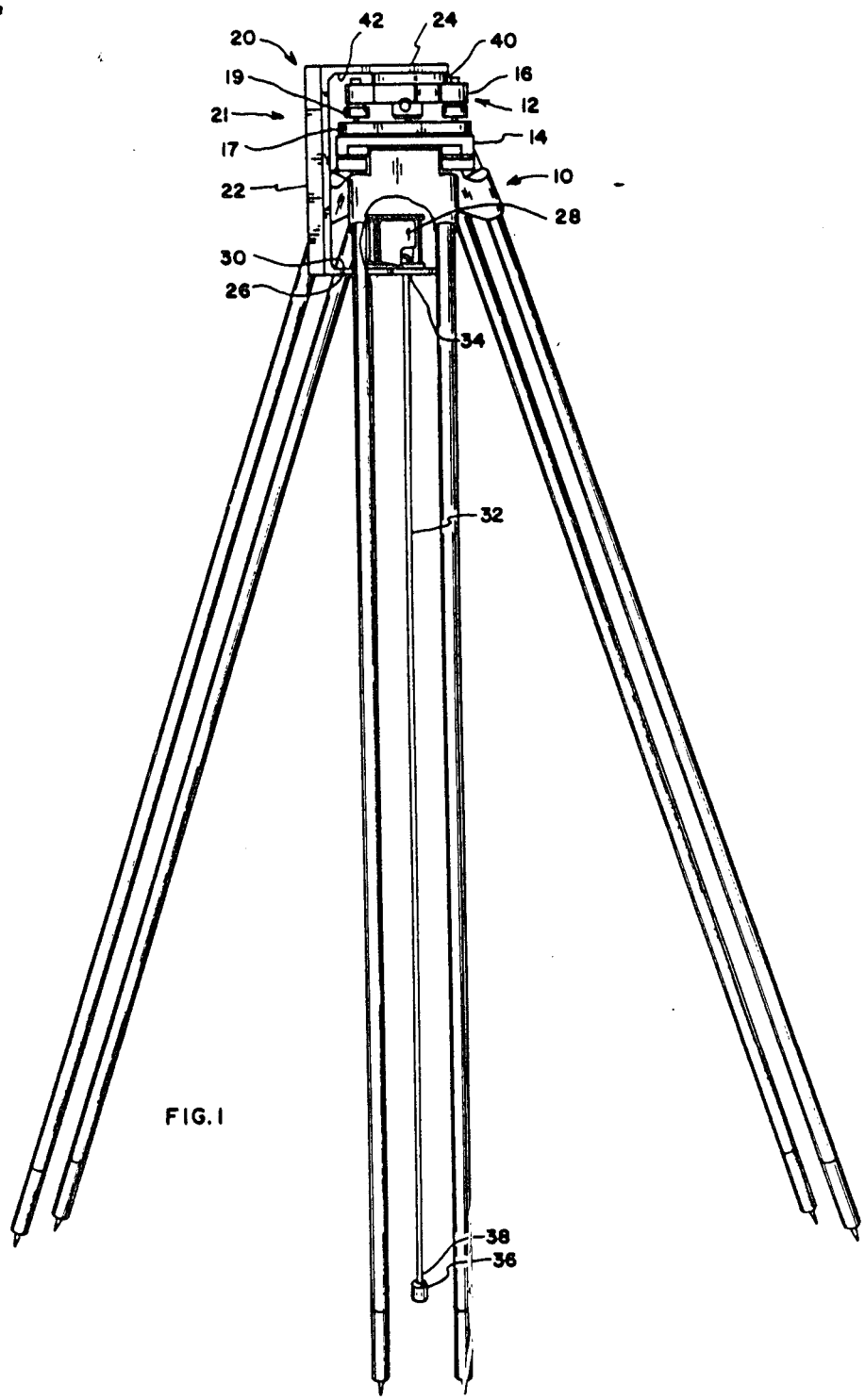
FIG. 1 is a partial elevational view of a tripod having a tribrach mounted thereon with the direct measurement device of the present invention mounted on the tribrach.

As seen in FIG. 1, a surveying tripod 10 is provided with a tribrach 12 on its upper surface 14. The tribrach (FIGS. 1 and 4) typically includes a centering dish 16 on its upper surface for supporting a surveying instrument, such as a theodolite (not shown), thereon. The surveying instrument typically includes at its base three downwardly depending studs which are to be positioned in the dish 16 of the tribrach. The tribrach typically also includes a base plate 17 and leveling screws 19. A locking mechanism 23 is provided to secure the centering dish of the tribrach against unintentional release after the tribrach assembly has been levelled. Theodolites, targets, reflectors, prism plummets, and other equipment can then be interchanged as required without changing or disturbing the position of the tribrach once the tribrach is locked in placed.

The present invention provides a means by which a direct measurement of the distance between the ground and a surveying instrument is provided. To provide for such measurement, a direct measuring device 20 is positioned on tripod 10 during the set-up operation. The device 20 includes a substantially C-shaped frame 21 having an upstanding portion 22 provided with substantially normally extending upper and lower legs 24 and 26, respectively. A tape measuring device 28 is shown in FIGS. 1 and 2 to be secured to the upper surface 30 of lower leg 26, with a calibrated tape 32 extending downwardly through a slot 34 in lower leg 26. The tape is provided with a weight 36 adjustably mounted at the distal end 38 thereof and may be calibrated in feet and meters.

An adapter 40 is secured to the lower surface 42 of upper leg 24 and includes studs 44 (FIGS. 2, 3, and 4) which are disposed for centering in the dished surface 16 of the tribrach. Adapter 40 may be universal so as to be similar to the base portions of the surveying instruments which are to be mounted on the tribrach for the surveying operation.

In operation, the tripod, having the tribrach thereon, is set up at the desired location, the bracket is attached with studs 44 of adapter 40 positioned in the dished surface 16 of the tribrach, and with the tribrach leveled and locked in position, the tape is extended downwardly to the ground level for measurement of the height of the tribrach above the ground. The direct measurement device is removed, and the surveying instrument is then mounted on the tribrach at the known height.

As seen in FIGS. 2 and 5, weight 36 is adjustably mounted on end 38 of the tape. The weight includes a slot 46 extending from the upper surface 48 thereof and into the interior thereof into which extends the end of the tape 32, which is held therein by a set screw 50. The tape may be shortened by a predetermined length to compensate for the distance between a point or surface on the tribrach or the adapter and a point (such as cross hairs, etc.) on the surveying instrument.

To secure tape measuring device 28 to lower leg 26, a rack assembly 52 is provided and includes upper and lower plates 54 and 56 disposed on opposite sides of measuring device 28. Plate 54 and 56 are retained in secured position by four screws 58 which extend through upper plate 54 and sleeves 60 and in threaded relation in lower plate 56 and lower leg 26 of member 21. As seen in FIG. 2, tape 32 extends through openings 62 and 34 provided in lower plate 56 of bracket assembly 52 and of lower leg 26 of frame 21.

Alternately, the tape measuring device 28 may be secured to the bottom surface 58 of lower leg 26 in similar manner, as shown in FIG. 4.

What is claimed is:

1. Apparatus for direct measurement of the height of a surveying instrument prior to said surveying instrument being mounted on an instrument engaging support, such as a tribrach carried on a tripod or the like, comprising:
    a frame having a central portion provided with upper and lower spaced arms extending in substantially normal relation therefrom;
    an adapter secured to said upper arm of said frame and disposed for being removably mounted in said instrument engaging support, said adapter being constructed similarly to the base of the surveying instrument to be mounted on said instrument engaging support for a surveying operation, said frame, and thereby said adapter, disposed for removal from said instrument engaging support responsive to said instrument engaging support being levelled and locked in a levelled position; and
    a tape measuring device secured to said lower arm of said frame and having a calibrated tape extending therefrom for measuring the distance to the ground or other supporting surface prior to emplacement of said surveying instrument on said instrument engaging support for a surveying operation.

2. Apparatus as set forth in claim 1 wherein said frame is provided with a substantially C-shaped configuration and disposed for mounting with said lower arm positioned beneath said instrument engaging support and said upper arm positioned above said instrument engaging support.

3. Apparatus as set forth in claim 2 wherein said frame is provided with bracket means for securing said tape thereto.

4. Apparatus as set forth in claim 3 wherein said bracket means includes first and second spaced members having said tape measuring device positioned therebetween and securing means for securing said first and second members together and for securing said second member to said lower arm.

5. Apparatus as set forth in claim 4 wherein said bracket is secured to the upper surface of said lower arm, and said lower arm is provided with an opening therethrough through which said calibrated tape extends.

6. Apparatus as set forth in claim 4 wherein said bracket means is secured to the lower surface of said lower arm.

7. Apparatus as set forth in claim 4 wherein said tape measuring device includes a weight adjustably mounted at the distal end of said calibrated tape.

8. Apparatus as set forth in claim 6 wherein said tape measuring device includes a weight adjustably mounted at the distal end of said calibrated tape.

* * * * *